United States Patent [19]

Mach

[11] Patent Number: 4,472,918
[45] Date of Patent: Sep. 25, 1984

[54] CONCEALED FASTENER RECEIVER

[75] Inventor: Theodore E. Mach, Lake Orion, Mich.

[73] Assignee: Allen Industries, Inc., Troy, Mich.

[21] Appl. No.: 262,240

[22] Filed: May 11, 1981

[51] Int. Cl.³ .............................................. E04B 1/38
[52] U.S. Cl. ...................................... 52/511; 24/618; 24/672; 24/289
[58] Field of Search ................. 52/511, 512, 787, 717; 24/618, 619, 623, 614, 664, 672, 671, 297, 289

[56] References Cited

U.S. PATENT DOCUMENTS

| | | |
|---|---|---|
| 3,709,733 | 1/1973 | Mautner .............................. 52/787 |
| 4,270,328 | 6/1981 | Page et al. .......................... 52/511 |
| 4,312,165 | 1/1982 | Mizusawa ........................... 52/511 |
| 4,396,329 | 8/1983 | Wollar ............................. 24/614 X |
| 4,422,276 | 12/1983 | Paravano ........................... 52/511 |

Primary Examiner—Carl D. Friedman
Attorney, Agent, or Firm—Joseph V. Tassone

[57] ABSTRACT

A fastener receiver for a vehicle panel construction, panel construction employing same, and method of fastening such panel construction employing such receiver are provided wherein the receiver is an improved two-piece receiver which is adapted to receive a portion of an associated fastener which is fastened to a vehicle frame to thereby fasten the panel construction to such frame in a concealed manner.

15 Claims, 6 Drawing Figures

U.S. Patent    Sep. 25, 1984    4,472,918 ns, claims, and drawing.

CONCEALED FASTENER RECEIVER

BACKGROUND OF THE INVENTION

1. Field of the Invention

This invention relates to a fastener receiver for a vehicle panel construction.

2. Prior Art Statement

Fastener receivers each carried by an associated vehicle panel construction in which each receiver is adapted to receive a portion of an associated fastener which is fastened to an automobile frame to thereby fasten the panel construction to such frame in a concealed manner are well known in the art. Such fastener receivers are used extensively in the automotive industry to fasten interior panel constructions in position.

SUMMARY

The fastener receivers in current use have deficiencies which include excessive cost, difficulty in using such fastener receivers, and a tendency to come loose from their associated fasteners.

It is a feature of this invention to provide an improved inexpensive fastener receiver for a vehicle panel construction wherein the receiver is carried by the panel construction and is adapted to readily receive a portion of an associated fastener which is fastened to a vehicle frame to fasten the panel construction in a concealed and high-strength manner.

For example, in accordance with this invention the fastener receiver comprises an outer member made of a comparatively high density rigid material, with the outer member having a cylindrical opening therethrough and an inside bearing surface adjoining the inner end of the cylindrical opening, and an inner member made of a displaceable comparatively low density material with the inner member being disposed against the bearing surface and having a central opening aligned coaxially with the cylindrical opening. The above-mentioned portion of the fastener extends through the cylindrical opening and at least partially within the central opening and such portion of the fastener has a locking edge disposed against the bearing surface to fasten the panel construction in position substantially in a locked manner.

Another feature of this invention is to provide an improved panel construction for a vehicle which utilizes an improved fastener receiver of the character mentioned.

Another feature of this invention is to provide an improved method of fastening a vehicle panel construction to an associated vehicle frame in a concealed manner utilizing a fastener receiver of the character mentioned.

Therefore, it is an object of this invention to provide an improved fastener receiver, an improved panel construction employing such a fastener receiver, and an improved method of fastening a vehicle panel construction utilizing such a fastener receiver having one or more of the novel features set forth above or hereinafter shown or described.

Others details, features, uses, objects, and advantages of this invention will become apparent from the embodiments thereof presented in the following specification, claims, and drawing.

BRIEF DESCRIPTION OF THE DRAWING

The accompanying drawing shows a present preferred embodiment of this invention, in which.

DETAILED DESCRIPTION

Figure 1:
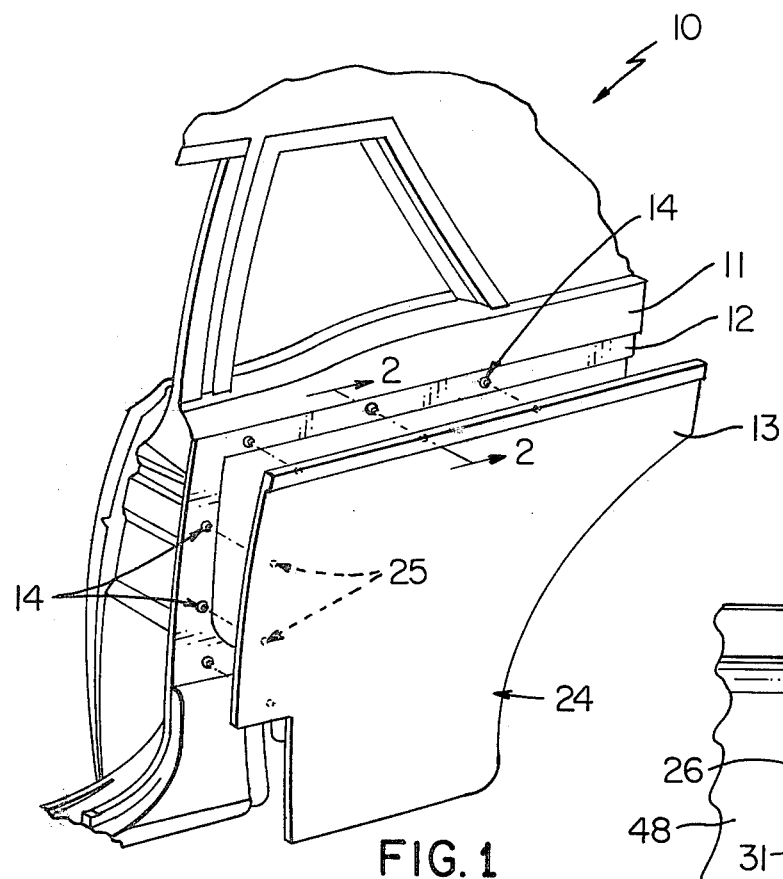
FIG. 1 is a perspective view illustrating a fragmentary portion of a vehicle which utilizes a panel construction of this invention which is shown exploded from its normal installed position and wherein such panel construction comprises a plurality of fastener receivers of this invention.
Figure 3:
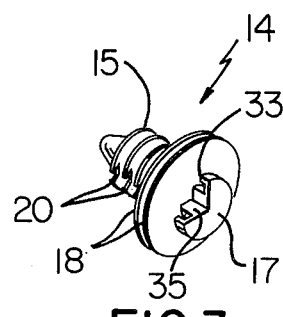
FIG. 3 is a perspective view illustrating a typical fastener which is utilized with the fastener receiver of this invention.

Reference is now made to FIG. 1 of the drawing which illustrates a fragmentary portion of a vehicle in the form of an automobile which is designated generally by the reference numeral 10; and, such fragmentary portion includes a right rear quarter 11 of such automobile which includes part of the automobile frame 12. A panel construction shown as a quarter trim panel construction 13, made in accordance with this invention, is provided and such panel construction is fastened to the frame 12 utilizing a plurality of fasteners 14.

Each fastener 14 has an inner end portion 15 which is particularly adapted to be received and self locked within an associated opening 16 in the frame 12 and such fastener 14 of this example has a fastening head 17 and a pair of spaced central discs 18 disposed between the inner portion 15 and the fasteneing head 17. The central discs 18 serve as an integral spacing means of the fastener which assure that with the inner portion 15 of the fastener fastened within an associated opening 16 the head 17 is disposed in a desired position to receive an associated fastener receiver, which will be described subsequently.

Figure 2:
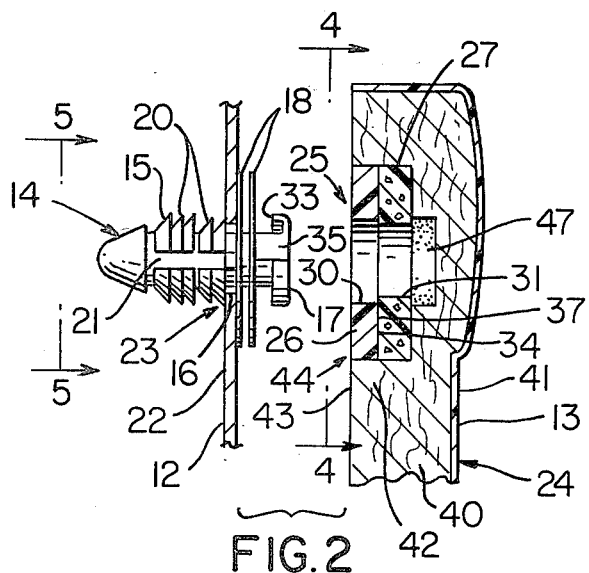
FIG. 2 is an enlarged fragmentary cross-sectional view taken essentially on the line 2—2 of FIG. 1.
Figure 5:
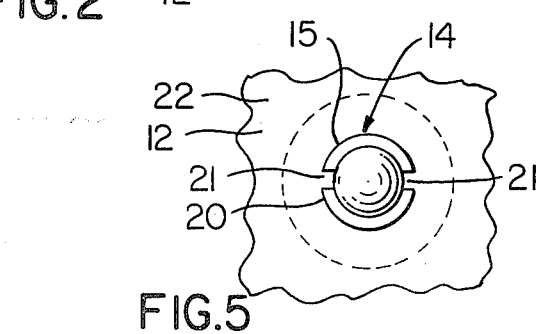
FIG. 5 is a fragmentary view taken essentially on the line 5—5 of FIG. 2.

Each fastener 14 is preferably made of a suitable yieldable, yet resilient, material such as a synthetic plastic material and has a plurality of axially spaced projections 20 which are basically annular with the exception of diametrically opposed cutouts 21 provided therein, and as illustrated in FIGS. 2 and 5. The projections 20 of each fastener 14 are particularly adapted to be deflected and urged through an associated opening 16 in the vehicle frame 12 upon urging the inner end portion 15 through such an opening; and, once the inner disc 18 engages the frame 12, the closest projection 20 to such frame snap locks against an inside surface 22 of the frame to hold the particular fastener in position in a substantially rigid and high strength manner and as shown at 23 in FIG. 2.

Figure 6:
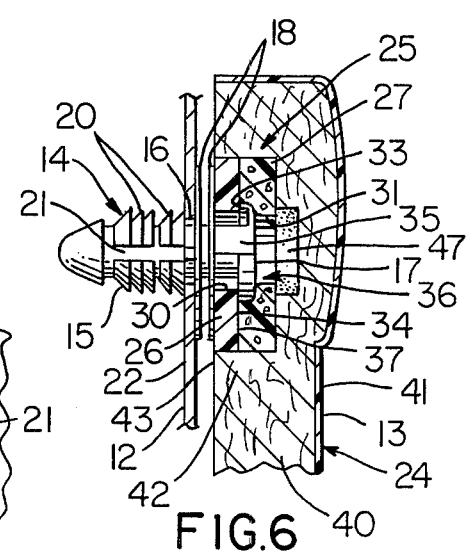
FIG. 6 is a view similar to FIG. 2 illustrating the components of FIG. 2 in assembled relation.

The panel construction 13 is comprised of a panel body 24 and a plurality of fastener receivers each designated generally by the same reference numeral 25 and each receiver 25 is carried by the panel body. Each receiver 25 is adapted to receive a head 17 of an associated fastener 14 to thereby fasten the panel construction 13 to the frame 12 in a concealed manner. The fastener receivers 25 are substantially identical and a typical receiver will be described in detail in connection with the illustration thereof in FIGS. 2 and 6.

Each receiver 25 is comprised of an outer member 26 made of a comparatively high density rigid material and an inner member 27 made of a displaceable and comparatively low density material. The outer member 26 has a cylindrical opening 30 extending therethrough which is a right circular cylindrical opening; and, the inner member 27 has a central opening 31 which is aligned coaxially with the cylindrical opening 30. The central opening 31 is also a right circular cylindrical opening which is smaller in diameter than the diameter of the opening 30.

Each fastener 14 has a head 17, as indicated earlier, and each head is adapted to be locked within an associated fastener receiver 25. In particular, for locking purposes, each head 17 extends through a cylindrical opening 30 and at least partially within an aligned central opening 31. The head 17 has a locking edge 33 (FIG. 6) and such head is extended within opening 31 until the edge 33 is disposed against the member 26 and in particular against a bearing surface 34 of member 26 which adjoins the inner end of the cylindrical opening 30 to thereby lock the fastener receiver 25 to the head 17 and simultaneously fasten the panel construction 13 in position against the frame 12, substantially in a locked manner.

The head 17 of each fastener 14 may be of any suitable construction known in the art; however, in this example such head is yieldingly compressible radially inwardly and this characteristic is made possible in part by the yieldable yet, resilient, polymeric material defining the overall fastener 14 and in part by a cutout 35 provided in the head 17. The cutout 35, in essence, removes about one-quarter of the head 17 and such cutout is defined by two radial planes intersecting at the central longitudinal axis of the fastener 14 with such planes being disposed at an angle of 90° to each other. As indicated earlier, the compressible character of the head 17 enables such head to be extended through cylindrical opening 30 which is smaller in diameter than the maximum diameter of the head. Once the inner edge 33 of such head moves past the bearing surface 34 the resilient character of such head enables same to, in essence, snap radially outwardly from its compressed condition thereby enabling the inner edge 33 to engage the bearing surface 34.

The inner member 27 is made of a material which, as described earlier, is displaceable and of comparatively low density. Although any suitable material may be used for this purpose, the material is preferably in the form of a synthetic plastic material, which may be a foam-like material, which is locally displaced or compressed by the head 17 as illustrated at 36 in FIG. 6. The physical properties of the material defining the inner member 27 are such that the head 17 can snap radially outwardly in a substantially unobstructed manner.

The cylindrical opening 31 of the inner member 27 of this example is smaller in diameter than the diameter of the cylindrical opening 30 of member 26. However, if desired, the inner member 27 may have an opening 31 of the same diameter as the diameter of the opening 30. In one application of this invention the diameter of the opening 31 of the inner member 27 was 8 millimeters and the diameter of the opening 30 of the outer member 26 was 10 millimeters.

Each of the members 26 and 27 is in the form of a washer-like member and the outer member is preferably made of a synthetic plastic material of a rigid and hard character. The inner member 27 also has a thickness which is greater than the thickness of the outer member 26 and this will be readily apparent from a viewing of FIGS. 2 and 6; and, the greater thickness of the inner member is for the purpose of accommodating the head 17 of the fastener 14 and head 17 is no greater in axial thickness than the thickness of the inner member 27. In the above-mentioned application the inner member 27 had a thickness of 4 millimeters and the outer member had a thickness of 2.5 millimeters.

The members 26 and 27 of each fastener receiver 25 need not necessarily be fastened together at their interface. However, such members are preferably fastened together on an annular surface portion remote from the diameter of the central opening 31 utilizing suitable adhesive means or an adhesive which is designated generally by reference numeral 37.

The fastener receiver 25 of this example is utilized to fasten the exemplary panel construction 13; and, such panel construction comprises the previously mentioned panel body 24 which is comprised of a substrate 40 and an outer layer 41. The substrate is preferably comprised of a molded synthetic plastic material of any suitable type utilized in the art and the outer layer is a decorative layer, preferably in the form of a decorative sheet 41 which is laminated against the substrate 40.

Each fastener receiver 25 is preferably fixed to the inside part 42 of the panel construction 13 utilizing any suitable technique known in the art. Preferably each fastener receiver is fastened in position by first adhesively fastening the members 26 and 27 adjacent the peripheral parts of their interface with adhesive 37 to thereby define the fastener receiver 25, in essence, as a two-piece laminate also designated by the reference numeral 25.

Figure 4:
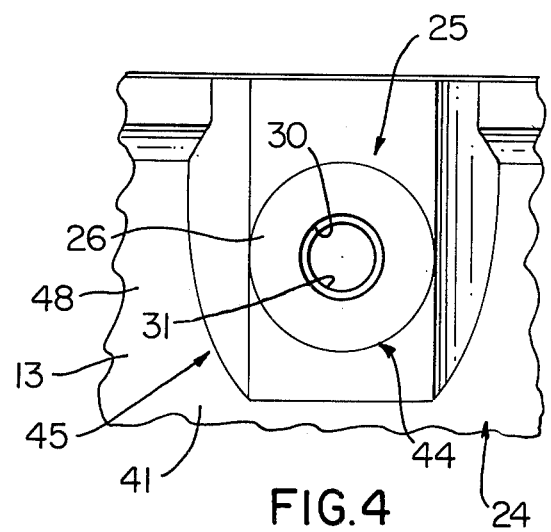
FIG. 4 is a view taken essentially on the line 4—4 of FIG. 2.

The outside surface of each fastener receiver 25 is disposed substantially flush with an exposed surface portion 43 of the inside part 42 of the panel construction 13 and as shown at 44 in FIGS. 2 and 4; and, such exposed surface 43 may be provided on a locally raised portion 45, as illustrated in FIG. 4, of the inside part 42. The surface portion 43 is disposed in a plane which is remote from the decorative sheet 41 as compared with the position of a plane containing the main part 48 of the inside surface of the panel 13.

The fixing of the two-piece laminate 25 to the panel construction 13 is preferably achieved by holding each two-piece laminate in a molding apparatus using a suitable fixture (not shown) and molding the inside part 42 therearound while simultaneously defining the entire substrate 40 for the panel 13. This molding of the inside part 42 around the fastener receiver 25 results in defining the inside part and simultaneous fixing of the two-piece laminate 25 to the substrate due to peripheral surface portions of the laminate engaging the substrate 40 and being adhesively bonded to the substrate. It will also be appreciated that an additional recess 47 may be provided in the substrate 40 inwardly of the fastener receiver 25 and this may be achieved by providing a plug component on the fixture which is used to hold each two-piece laminate or fastener receiver 25 in the molding apparatus. The diameter of the recess 47 is preferably slightly smaller than the diameter of the opening 30 to facilitate its insertion and removal and with the member 27 being easily displaceable, the plug component may be easily inserted and withdrawn therethrough.

Molding may be achieved utilizing techniques known in the art and utilizing temperatures and pressures which are also known in the art. Accordingly, it will be appreciated that the material used to define the outer member 26 and inner member 27 of the fastener receiver 25 are such that they are capable of withstanding the temperatures and pressures associated with the molding operation while keeping such components and hence the two-piece laminate or fastener receiver 25 substantially intact, i.e. free of damage or partial collapse during molding. It will be appreciated that during molding the inner member 27 (with its comparatively small diameter opening 31) effectively isolates the thermoplastic flowable material which defines the substrate 40 and prevents its movement toward and against bearing surface 34. Also, the fixture used to hold the receiver 25 in position prevents the flowable material defining the substrate 40 from flowing into central opening 31.

Once the molding operation is completed, the substrate 40 is removed and the outer decorative sheet 41 is suitably bonded thereagainst using known apparatus and techniques.

The above description has been directed to the molding of a single fastener receiver 25 within the substrate 40; and, with the detailed construction of a single fastener receiver 25. However, it will be appreciated that this description is fully applicable to the molding of a plurality of fastener receivers comprising the panel construction 13 in a single molding operation; and, the description of the fastener receiver 25 is fully applicable to all fastener receivers.

Reference has been made herein to the utilization of synthetic plastic material to define component members 26-27 of the fastener receiver 25. The term synthetic plastic material as used herein is intended to cover any material of high molecular weight which contains as an essential ingredient thereof a synthetic or semi-synthetic organic substance and is made by any one or more of known production processes.

In this disclosure of the invention each fastener 14 utilized with an associated fastener receiver 25 is of a particular type having a head 17 with a cutout 35 and a locking edge 33 provided on a depending flange-like portion of the head 17; however, it is to be understood that any suitable fastener may be utilized in lieu of the fastener 14 as long as it provides a fastening action which is substantially a locking action of the character described herein and wherein the inner edge of a head portion of such a fastener may be urged in locked engagement against a bearing surface 34 of an outer member 26 of the fastener receiver.

The members 26 and 27 have been described as being washer-like members having cylindrical opening 30 and 31 respectively therethrough; however, it will be appreciated that the outer periphery of each member 26-27 may be circular or any other configuration including polygonal.

The outer member 26 of the fastener receiver is preferably made of a synthetic plastic material as described above and a typical material which has been used successfully for this purpose is provided by the Borg-Warner Corporation of Parkersburg, West Virginia 26101 and sold under the trade designation X-11 ABS. However, if desired the outer member 26 may be made of metal.

Similarly, the inner member 27 is also preferably made of a suitable synthetic plastic material, as described previously, which is a displaceable comparatively low density material. A material which has been used successfully for this purpose is provided by the Dow Chemical Company of Midland, Michigan 48640 and sold under the trade designation of Ethafoam 900.

The above-mentioned synthetic plastic material comprising the outer member 26 preferably has a durometer hardness as measured on the A scale of 100 (Rockwell R). Similarly, the above-mentioned plastic displaceable material utilized to define the inner member 27 has a yielding displaceable character due to the following properties thereof: density, 9 pcf; tensile strength, 130 psi; tensile elongation, 100%; tear strength, 50 lb./in.

While present exemplary embodiments of this invention, and methods of practicing the same, have been illustrated and described, it will be recognized that this invention may be otherwise variously embodied and practiced within the scope of the following claims.

What is claimed is:

1. In a fastener receiver for a vehicle panel construction wherein said receiver is carried by said panel construction and is adapted to receive a portion of an associated fastener which is fastened to a vehicle frame to fasten said panel construction to said vehicle frame in a concealed manner, the improvement wherein said receiver is separate from and affixed to said panel construction and comprises, an outer rigid and hard washer-like member having a first right circular cylindrical opening therethrough and an inside bearing surface adjoining the inner end of said first cylindrical opening, and an inner washer-like member made of a displaceable comparatively low density material, said inner member being disposed against said bearing surface and having a second right circular central opening aligned coaxially with said first cylindrical opening, said second opening having a smaller diameter than said first opening, said portion of said fastener extending through said first cylindrical opening and at least partially within said second central opening, said portion of said fastener having a locking edge disposed against said bearing surface to fasten said panel construction in position substantially in a locked manner.

2. A fastener receiver as set forth in claim 1 in which said panel construction has a principal inside surface and comprises a locally raised portion having an exposed surface disposed in a plane which is different from the plane of said principal inside surface, said receiver disposed in said locally raised portion, the outside surface of said receiver being substantially flush with said exposed surface.

3. A fastener receiver as set forth in claim 1 in which said portion of said fastener is defined by a fastener head having an inner edge defining said locking edge, said head being yieldingly compressible radially inwardly to enable extending same through said cylindrical opening and said head being adapted to snap radially outwardly from a compressed condition thereof upon moving past said bearing surface enabling said inner edge to engage said bearing surface, and said low density material of said inner member enabling said head to snap radially outwardly in an unobstructed manner.

4. A fastener receiver as set forth in claim 1 in which said inner member has a thickness which is greater than the thickness of said outer member, said greater thickness being capable of accommodating said head having a thickness which is no greater than said greater thickness.

5. A fastener receiver as set forth in claim 4 in which each of said members is made of a non-metallic material.

6. A fastener receiver as set forth in claim 5 in which said outer member is made of a synthetic plastic material.

7. In a panel construction for a vehicle comprising a panel body and a plurality of fastener receivers carried by said body, each of said receivers being adapted to receive a head of an associated fastener which has an inner end portion fastened to the frame of said vehicle to fasten said panel construction to said frame in a concealed manner, the improvement wherein each receiver is separate from and affixed to said panel body and comprises, an outer rigid and hard washer-like member made of a comparatively high density rigid material, said outer member having a cylindrical opening therethrough and an inside bearing surface adjoining the inner end of said cylindrical opening, and an inner washer-like member made of a displaceable comparatively low density material, said inner member being disposed against said bearing surface and having a central opening aligned coaxially with said cylindrical opening, said head of said associated fastener extending through said cylindrical opening and at least partially within said central opening, said head of said associated fastener having a locking edge disposed against said bearing surface to fasten said panel construction in position against said frame substantially in a locked manner.

8. A panel construction as set forth in claim 7 in which said panel body comprises a substrate and an outer layer defining a decorative surface of said panel.

9. A panel construction as set forth in claim 8 in which said panel body has a principal inside surface and comprises a plurality of locally raised portions each having exposed surfaces disposed in a plane which is remote from said decorative surface as compared with the plane of said principal inside surface, said receivers disposed in said locally raised portions, the outside surface of each of said receivers being substantially flush with a corresponding exposed surface.

10. A panel construction as set forth in claim 8 in which said substrate comprises a molded synthetic plastic material.

11. A panel construction as set forth in claim 10 in which said outer layer is defined by a decorative sheet laminated against said substrate.

12. A panel construction as set forth in claim 11 in which said head of said associated fastener has an inner edge defining said locking edge, said head being yieldingly compressible radially inwardly to enable extending same through said cylindrical opening and said head being adapted to snap radially outwardly from a compressed condition thereof upon moving past said bearing surface enabling said inner edge to engage said bearing surface, and said low density material of said inner member enabling said head to snap radially outwardly in an unobstructed manner.

13. A panel construction as set forth in claim 12 in which said cylindrical opening of each receiver is a first right circular cylindrical opening and said central opening thereof is a second right circular cylindrical opening.

14. A panel construction as set forth in claim 13 in which said second opening of each receiver is smaller in diameter than the diameter of its first opening.

15. A panel construction as set forth in claim 14 in which each of said members is a washer-like member and each is made of a non-metallic material.

* * * * *